United States Patent [19]
Anderson

[11] 3,886,406
[45] May 27, 1975

[54] OVERSPEED CONTROL SYSTEM FOR A VEHICLE

[75] Inventor: Robert F. Anderson, Rochester, N.Y.

[73] Assignee: General Signal Corporation, Rochester, N.Y.

[22] Filed: Oct. 1, 1973

[21] Appl. No.: 402,551

[52] U.S. Cl............................. 317/5; 317/DIG. 6
[51] Int. Cl. .......................................... H01h 47/02
[58] Field of Search.................... 317/5, DIG. 6, 123

[56] References Cited
UNITED STATES PATENTS
2,762,464   9/1956   Wilcox................................... 317/5
3,660,731   5/1972   Darrow.......................... 317/DIG. 6

OTHER PUBLICATIONS
Rovnyak, "Arc, Surge and Noise Suppression," Electronics World, pages 46–48, May 1967.

Primary Examiner—L. T. Hix
Attorney, Agent, or Firm—Milton E. Kleinman; Harold S. Wynn

[57] ABSTRACT

An overspeed detector relay is governed by outputs of an oscillator and a tachometer frequency generator through a high-pass filter and amplifier. A step-up transformer is provided having a primary winding energized by output of the amplifier, and control apparatus is provided for the detector relay including a full-wave rectifier connected across a resistor and a winding of the detector relay in series for energizing the detector relay by output of a secondary winding of the step-up transformer. This makes the detector relay quick to respond to de-energization since the shunting effect of the full-wave rectifier is reduced by the series resistor that serves to isolate the relay coil from the rectifier.

4 Claims, 1 Drawing Figure

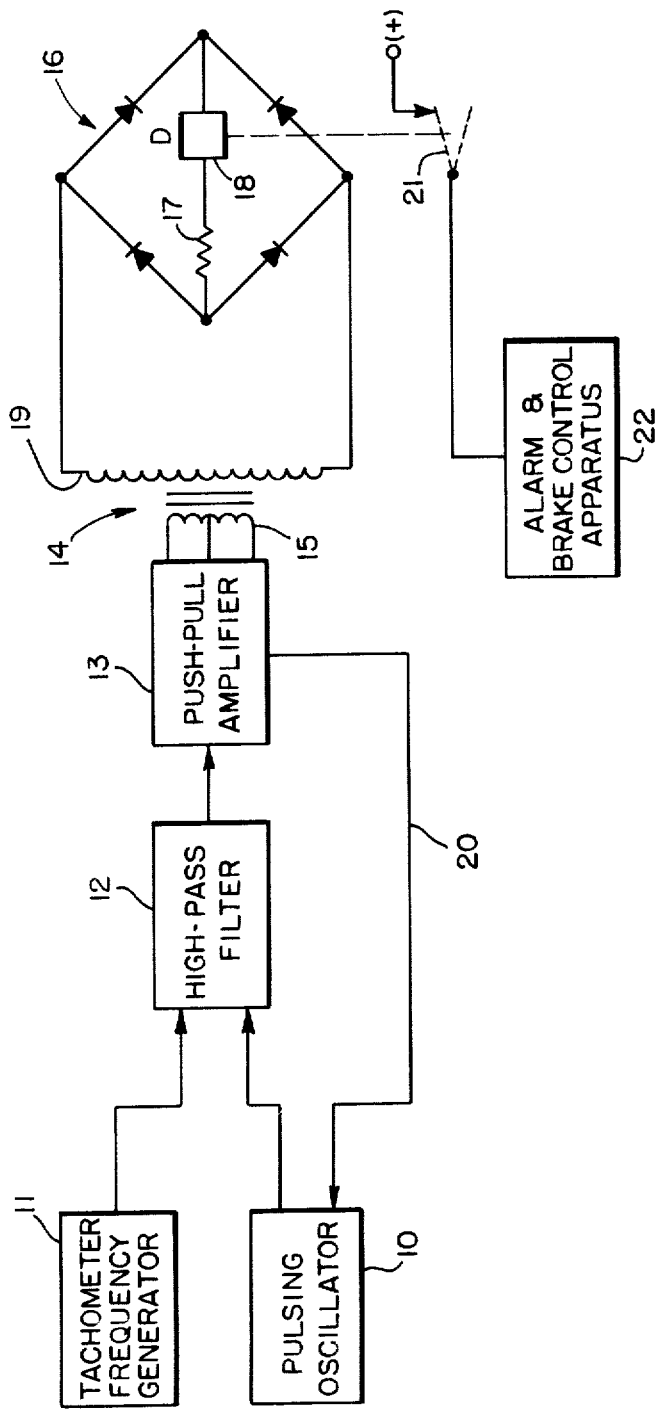

OVERSPEED CONTROL SYSTEM FOR A VEHICLE

Background of the Invention

While the invention is subject to a wide range of applications, it is especially suited for use in an overspeed control system for a vehicle, and it will be particularly described in this connection as a preferred embodiment.

The present invention is an improvement over the overspeed control system disclosed in the Wilcox U.S. Pat. No. 2,762,464, granted Sept. 11, 1956. This patent is assigned to the same assignee as the present invention, and this patent is hereby incorporated by reference in the preferred embodiment of the present invention.

A system such as is disclosed in this Wilcox patent, comprises a tachometer which generates a frequency comparable to vehicle speed. A detector relay is energized if the frequency generated by the tachometer becomes above the frequency of a high-pass filter. Energization of the relay is through an output transformer and a full-wave rectifier connected across the relay. Steady energization of the detector relay is indicative of an overspeed condition.

To check the integrity of the system for the energization of the detector relay, an oscillator signal is fed through the high-pass filter at a frequency to be passed by the filter and is pulsed so as to normally pulse the detector relay. The pulsing of the detector relay is indicative of a check on the system as compared to steady energization of the relay being indicative of an overspeed condition.

The speed of response in case of an overspeed condition, is of course, dependent upon the time required in the system to sense that a steady overspeed condition of steady energization of the detector relay is effective as compared to the intermittent checking operation of the relay. The speed of response of the system according to the Wilcox patent, is sufficient for trains operating at substantial time separation, but under current operating conditions for people mover systems, particularly for airports and the like, vehicles are operated on much closer headway, and thus it is important that the time required to sense an overspeed condition materially be reduced.

An object of the present invention is to provide an improved overspeed system which substantially shortens the time of response in detecting an overspeed condition.

Other objects, purposes and characteristic features of the present invention will be in part obvious from the accompanying drawing and in part pointed out as the description of the invention progresses.

SUMMARY OF THE INVENTION

An overspeed control system for a vehicle is provided having a detector relay controlled by outputs of an oscillator and a tachometer frequency generator through a high-pass filter and amplifier. A step-up transformer is provided in the output of the amplifier and the relay is controlled by output of an independent secondary winding of the step-up transformer through a full-wave rectifier and a resistor connected in series with the detector relay winding. This provides that the detector relay is quick to respond to deenergization irrespective of the shunting of the full-wave rectifier across its winding. Thus, the pulsing rate can be increased materially as compared to the pulsing rate of the prior arrangements, and therefore less time is required to sense a shifting from the normal checking condition to detection of an overspeed condition.

For a better understanding of the present invention, together with other and further objects thereof, reference is had to the following description, taken in consideration with the accompanying drawing, while its scope will be pointed out in the appending claims.

With reference to the drawing, an overspeed control system is disclosed for a vehicle having a detector relay D controlled by outputs of a pulsing oscillator 10 and a tachometer frequency generator 11 through a high-pass filter 12 and a push-pull amplifier 13. A step-up transformer 14 has a center-tapped primary winding 15 connected to output of the push-pull amplifier 13. A full-wave rectifier 16 is connected across a resistor 17 and a winding 18 of the detector relay D in series for energizing the detector relay D by output of independent secondary winding 19 of transformer 14.

Pulsing of oscillator 10 is accomplished by a pulsing circuit in amplifier 13 effective over line 20 to pulse oscillator 10 at a rate of approximately 20 pulses per minute. This causes relay D to normally pulse at this rate and to intermittently apply energy through its front contact 21 to alarm and brake control apparatus 22. The alarm and brake control apparatus 22 is maintained inactive by the pulsing of contact 21, but if contact 21 ceases to pulse, the apparatus 22 is rendered effective to stop the vehicle.

When there is an overspeed condition, the tachometer frequency generator 11 delivers a frequency high enough to be passed by the high-pass filter 12, and the passing of this frequency maintains the detector relay D steadily energized, which in turn renders the warning and the brake apparatus 22 effective.

From the above descirbed mode of operation, it is readily apparent that the speed of response of the system to detect an overspeed condition is dependent upon the time required to distinguish between normal pulsing and the steady energization condition of the detector relay D. By use of the step-up transformer and by a resistor 17 in series with the winding of relay D and at a much higher resistance, (approximately 10 times the resistance of the winding of relay D), it is provided that the shunt of the full-wave rectifier 16 across the relay D is much less effective than in the system according to the Wilcox patent and thus the relay D is made quick to drop away irrespective of the shunt of the rectifier 16. Because of this, the rate of pulsing is increased materially over the rate of pulsing of the corresponding relay in the Wilcox patent for much quicker sensing of an overspeed condition.

It has been found that without the step-up transformer, and without the relatively high value resistor 17 in series with the detec tor relay winding, the drop-away time of relay D is generally about 750 miliseconds, while using these elements according to the present invention reduces the drop-away time of relay D to about 70 miliseconds.

While there has been described what is at present considered to be the preferred embodiment of the invention, it will be obvious to those skilled in the art that various changes and modifications may be made therein, without departing from the invention, and it is therefore aimed in the appending claims to cover all such changes and modifications as fall within the true spirit and scope of the invention.

What is claimed is:

1. An overspeed control system for a vehicle having a detector relay controlled by outputs of an oscillator and a tachometer frequency generator through a high-pass filter and amplifier wherein the improvement comprises;
   a. a step-up transformer having a primary winding energized by output of the amplifier,
   b. control means including a full-wave rectifier connected across a resistor and a winding of the detector relay in series for energizing the detector relay by output of an independent secondary winding of the step-up transformer,
   c. the resistor having a resistance value several times the resistance of the detector relay winding,
   d. whereby the detector relay is quick to respond to de-energization since the shunting effect of the full-wave rectifier is reduced by the series resistor that serves to isolate the relay winding from the rectifier.

2. An overspeed control system according to claim 1 wherein;
   a. the oscillator generates a frequency above the frequency of the high-pass filter, and
   b. the control means normally pulses the oscillator and the detector relay.

3. An overspeed control system according to claim 2 wherein brake control means is provided for causing application of brakes of the vehicle upon cessation of pulsing of the detector relay.

4. An overspeed control system according to claim 1 wherein the step-up transformer has a center-tapped primary winding included in a push-pull amplifier circuit.

* * * * *